United States Patent
Wu et al.

(10) Patent No.: US 8,654,697 B2
(45) Date of Patent: Feb. 18, 2014

(54) INTELLIGENT ASSISTED TRANSMISSION METHOD FOR MULTICAST BROADCAST SERVICE

(75) Inventors: Qi Wu, Beijing (CN); Hai Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 729 days.

(21) Appl. No.: 12/704,835

(22) Filed: Feb. 12, 2010

(65) Prior Publication Data

US 2010/0208642 A1    Aug. 19, 2010

(30) Foreign Application Priority Data

Feb. 13, 2009  (CN) .......................... 2009 1 0006722

(51) Int. Cl.
*H04H 20/71* (2008.01)
*H04L 12/28* (2006.01)
*H04L 12/56* (2011.01)

(52) U.S. Cl.
USPC ............ 370/312; 370/389; 370/390; 370/392

(58) Field of Classification Search
USPC ............................ 370/312, 389, 390, 392, 432
See application file for complete search history.

(56) References Cited

U.S. PATENT DOCUMENTS

| 7,986,633 | B2 * | 7/2011 | Ryu et al. ...................... 370/252 |
| 2005/0071459 | A1 * | 3/2005 | Costa-Requena et al. .... 709/224 |
| 2005/0078641 | A1 * | 4/2005 | Kim ............................... 370/335 |
| 2008/0037472 | A1 | 2/2008 | Ryu et al. |
| 2008/0107110 | A1 | 5/2008 | Andou et al. |
| 2008/0212509 | A1 * | 9/2008 | Kim et al. ..................... 370/312 |
| 2008/0212529 | A1 * | 9/2008 | Kim et al. ..................... 370/329 |
| 2009/0013079 | A1 * | 1/2009 | Dickens et al. ............... 709/227 |
| 2009/0052407 | A1 * | 2/2009 | Motegi et al. ................. 370/336 |
| 2009/0276674 | A1 * | 11/2009 | Wei et al. ...................... 714/749 |
| 2010/0118847 | A1 * | 5/2010 | Lee et al. ...................... 370/338 |
| 2010/0254295 | A1 * | 10/2010 | Ahn et al. ...................... 370/312 |
| 2010/0278091 | A1 * | 11/2010 | Sung et al. .................... 370/312 |
| 2010/0323737 | A1 * | 12/2010 | Koo et al. ...................... 455/509 |
| 2011/0038297 | A1 * | 2/2011 | Conte et al. ................... 370/312 |
| 2011/0136526 | A1 * | 6/2011 | Park et al. ..................... 455/509 |

FOREIGN PATENT DOCUMENTS

| JP | 07-264652 A | 10/1995 |
| KR | 10-2006-0020749 A | 3/2006 |
| WO | 2008/072691 A1 | 6/2008 |

* cited by examiner

*Primary Examiner* — Farah Faroul
(74) *Attorney, Agent, or Firm* — Jefferson IP Law, LLP

(57) ABSTRACT

An intelligent assisted transmission method is provided. In the method, a Multicast and Broadcast Service (MCBCS) Server transmits Multicast Broadcast Service (MBS) data to a base station in an MBS area. The base station transmits the MBS data to a user equipment. If the user equipment cannot correctly receive the MBS data, it returns a Not Acknowledgement (NACK) message to the base station. The base station transmits an intelligent assisted transmission prompt to the MCBCS Server. The MCBCS Server transmits an intelligent assisted transmission request to adjacent base stations of the base station. When the intelligent assisted transmission request is received, the adjacent base stations return an intelligent assisted transmission response. The MCBCS Server transmits the MBS data to the adjacent base stations, and the adjacent base stations transmit the MBS data to the user equipment.

20 Claims, 6 Drawing Sheets

INTELLIGENT ASSISTED TRANSMISSION METHOD FOR MULTICAST BROADCAST SERVICE

PRIORITY

This application claims the benefit under 35 U.S.C. §119(a) of a Chinese patent application filed on Feb. 13, 2009 in the Chinese Intellectual Property Office and assigned Serial No. 200910006722.7, the entire disclosure of which is hereby incorporated by reference.

BACKGROUND OF THE INVENTION

1. Field of the Invention

The present invention relates to an intelligent assisted transmission for a wireless communication system containing a Relay Station (RS). More particularly, the present invention relates to an intelligent assisted transmission method for a Multicast Broadcast Service (MBS) in a wireless communication system.

2. Description of the Related Art

In a conventional Institute of Electrical and Electronics Engineers (IEEE) 802.16 system, an MBS is transmitted in multicast/broadcast areas. A multicast/broadcast area includes one or several base stations. These base stations adopt the same modulation and coding method when transmitting the MBS and transmit the same content with the same frequency. In a middle part of an MBS area, the same signals received from all adjacent base stations are superimposed with a high signal to interference noise ratio. In edges of the MBS area, a user equipment receives both the multicast/broadcast signal transmitted by the base stations in the MBS area and other signals transmitted by base stations from non-MBS areas with a low signal to interference noise ratio.

The IEEE 802.16m system prescribes that a multi-base station MBS, which supports macro diversity, should have a spectrum efficiency of 2 bps/Hz (when the base station interval is less than 1.5 Km) or 4 bps/Hz (when base station interval is less than 0.5 Km). In a center of an MBS area, since all signals received by the user equipment are available signals rather than interference, it is not difficult to reach such spectrum efficiency. However, at edges of the MBS area, due to interference from base stations from non-MBS areas, the attainable spectrum efficiency is very low. Simulation for Long Term Evolution (LTE) shows that spectrum efficiency at cell edges is usually lower than 0.1 bps/Hz.

The above analysis shows that there are large spectrum efficiency differences between the edges and the center of an MBS area. Because the whole MBS area adopts the same modulation and coding method, a modulation and coding method which meets the requirements of the IEEE 802.16m system cannot perform normal decoding at the MBS area boundary.

Hierarchical modulation has been proposed to meet required channel quality differences between the various user equipment. In the hierarchical modulation, a user equipment with poor channel quality only needs to make demodulation (such as QPSK) at the basic layer to get preliminary information (such as low-quality video pictures), while a user equipment with high channel quality can perform demodulation (such as 16QAM or 64QAM) at a higher layer to get further information (such as high-quality video pictures). However, a normal rate difference between the basic layer and the higher layers in hierarchical modulation is 1:2 or 1:3. For the edges and center of the MBS area, a rate difference of around 1:20 cannot be reached.

In LTE, Huawei has suggested to adopt a method of dynamic multicast service to solve the MBS area boundary problem. Specifically, the system tracks down a movement of the user equipment between cells based on a counting process, dynamically adjusts the size of the MBS area, and thus makes macro diversity always exist at a position in which the user equipment is located. However, in the IEEE 802.16m system, a user equipment under an idle mode can cross cell boundaries without informing the base station. Consequently, it is not possible to use such a method in the IEEE 802.16m system to solve the MBS area boundary problem.

SUMMARY OF THE INVENTION

Aspects of the present invention are to address at least the above-mentioned problems and/or disadvantages and to provide at least the advantages described below. Accordingly, an aspect of this invention is to provide an intelligent assisted transmission method for an MBS in a wireless communication system.

In accordance with an aspect of the present invention, an intelligent assisted transmission method is provided. The method comprises transmitting, by a Multicast and Broadcast Service (MCBCS) Server, Multicast Broadcast Service (MBS) data to a base station in an MBS area, transmitting, by the base station, the MBS data to a user equipment, if the user equipment cannot correctly receive the MBS data, returning a NACK message to the base station, transmitting, by the base station, an intelligent assisted transmission prompt to the MCBCS Server, transmitting, by the MCBCS Server, an intelligent assisted transmission request to an adjacent base station of the base station, when receiving the intelligent assisted transmission request, returning, by the adjacent base station, an intelligent assisted transmission response, transmitting, by the MCBCS Server, the MBS data to the adjacent base station, and transmitting, by the adjacent base station, the MBS data to the user equipment.

In an exemplary implementation of the present invention, the base station at the MBS area boundary detects the negative feedback information from the user equipment. If the negative feedback frequency exceeds a threshold, the base station will report to the MCBCS Server, and the MCBCS Server will invite an adjacent base station outside the MBS area of the base station to join in multicast/broadcast transmission and also achieve the effect of macro diversity at the MBS area boundary, thus improving spectrum efficiency at the MBS area boundary.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention propose an intelligent assisted transmission method for an Institute of Electrical and Electronics Engineers (IEEE) 802.16m Multicast Broadcast Service (MBS).

Figure 1:
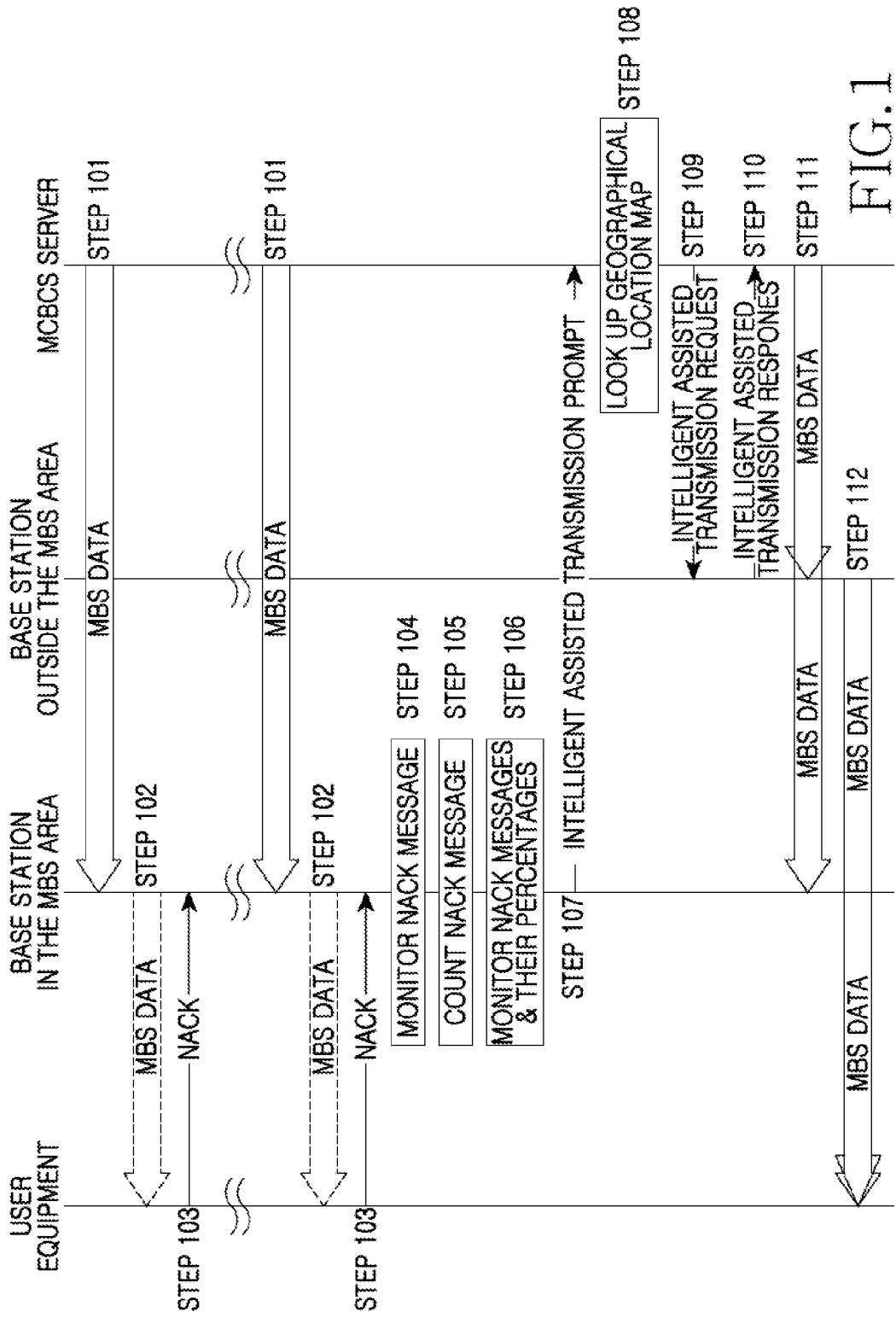
FIG. 1 is a flow diagram of an intelligent assisted transmission method for a Multicast Broadcast Service (MBS) according to an exemplary embodiment of the present invention.

FIG. 1 is a flow diagram of an intelligent assisted transmission method for an MBS according to an exemplary embodiment of the present invention.

Referring to FIG. 1, in step 101, a Multicast and Broadcast Service (MCBCS) Server transmits MBS data to a base station in the MBS area.

In step 102, the base station in the MBS area transmits the MBS data to the user equipment.

In step 103, the user equipment demodulates and decodes the received MBS data. If the demodulation and decoding is not successful, the user equipment will transmit in the Not Acknowledgement (NACK) channel a NACK message to the base station in the MBS area.

In step 104, the base station in the MBS area monitors the NACK channel for the NACK message transmitted by the user equipment. If the base station finds the NACK message, the process proceeds to step 105.

In step 105, the base station in the MBS area counts the number of received NACK messages.

In step 106, the base station in the MBS area monitors the number of times of appearance of NACK messages and their percentages. If set conditions are met, the process proceeds to step 107.

In step 107, the base station in the MBS area transmits an intelligent assisted transmission prompt message to the MCBCS Server.

In step 108, after the MCBCS Server receives the intelligent assisted transmission prompt message transmitted by the base station in the MBS area, the MCBCS Server will determine a geographical location of the base station and, using the location, determine a list of base stations that are adjacent to the base station in the MBS area and not belonging to the MBS area.

In step 109, the MCBCS Server transmits an intelligent assisted transmission request message to each or some of the base stations on the base station list and requests these base stations to join in intelligent assisted transmission.

In step 110, when a base station outside the MBS area receives the intelligent assisted transmission request message from the MCBCS Server, the base station outside the MBS area will transmit an intelligent assisted transmission response message to the MCBCS Server.

In step 111, the MCBCS Server concurrently transmits MBS data to the base station in the MBS area and the base station outside the MBS area transmitting an intelligent assisted transmission response message to the MCBCS Server at step 110.

In step 112, the base station in the MBS area and the base station outside the MBS area transmitting the intelligent assisted transmission response message to the MCBCS Server at step 110 transmit MBS data to the user equipment.

Figure 2:
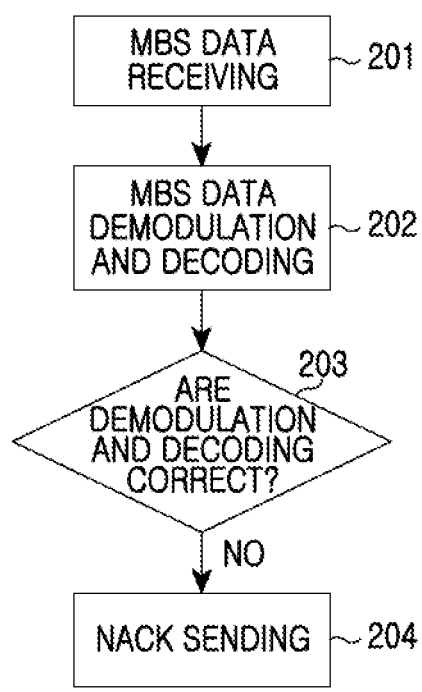
FIG. 2 is a schematic diagram of actions performed at a user equipment end according to an exemplary embodiment of the present invention.

FIG. 2 is a schematic diagram of actions performed at a user equipment end according to an exemplary embodiment of the present invention.

Referring to FIG. 2, in step 201, the user equipment receives the MBS data from the base station.

In step 202, the user equipment demodulates and decodes the received MBS data.

In step 203, the user equipment determines whether the demodulation and decoding are successful. If it is determined that the demodulation and decoding are not successful, the process proceeds to step 204. Otherwise, no action is taken.

In step 204, the user equipment transmits a NACK message in the NACK channel.

Figure 3:
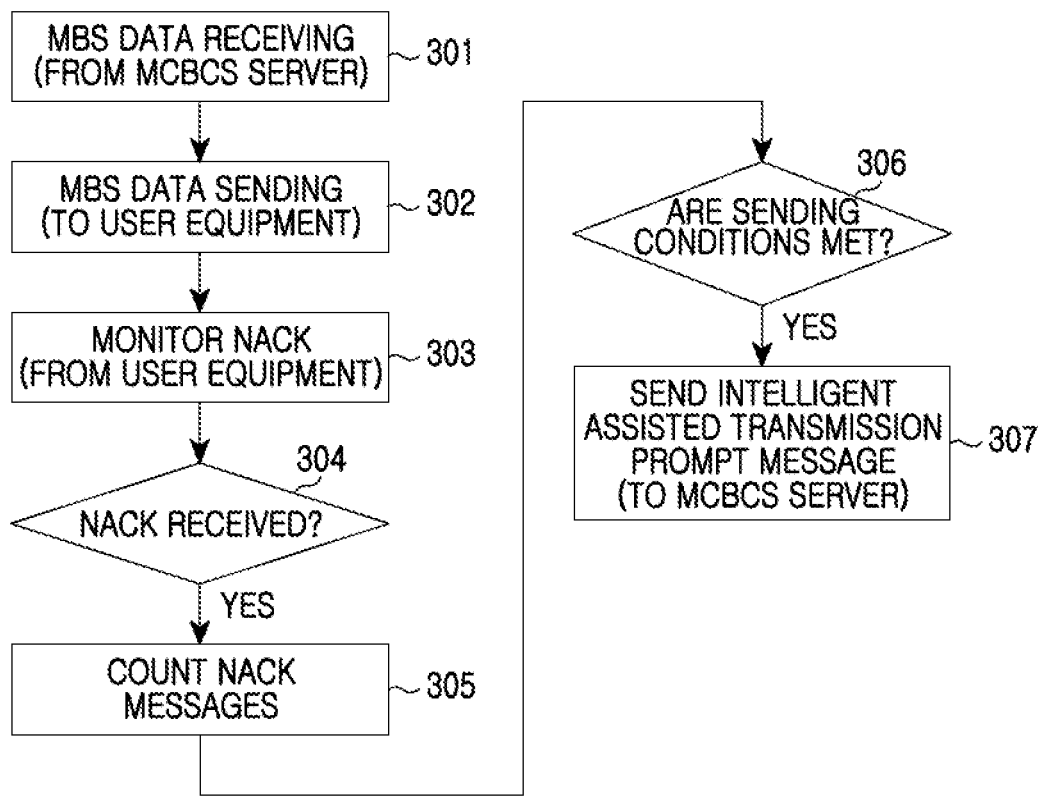
FIG. 3 is a schematic diagram of actions performed at a base station end in an MBS area according to an exemplary embodiment of the present invention.

FIG. 3 is a schematic diagram of actions performed at a base station end in an MBS area according to an exemplary embodiment of the present invention.

Referring to FIG. 3, in step 301, the base station receives the MBS data transmitted by the MCBCS Server.

In step 302, the base station transmits the MBS data from the MCBCS Server to the user equipment.

In step 303, in the NACK channel, the base station monitors for receipt of the NACK message from the user equipment.

In step 304, the base station determines if it receives the NACK message transmitted by the user equipment. If the base station determines that it receives the NACK message, the process proceeds to step 305.

In step 305, the base station counts the number of the NACK messages. More specifically, the base station counts the percentage of appearance of NACK messages and the number of times of such appearances.

In step 306, the base station determines if the counting of NACK messages meets certain conditions. If it is determined that the conditions are met, the base station proceeds to step 307. Examples of the certain conditions include:

(1) In the recent MBS transmissions, the percentage of NACK message appearances is greater than a value P1, wherein P1 is a permissible frame error rate of the system. The value may vary between different systems and different services. For example, it may have a value of 0.02, 0.03, 0.05 or 0.1; and (2) The base station in the MBS area is located an edge of the MBS area;

or (1) In the recent transmissions, the NACK message is received in every transmission; and (2) The base station in the MBS area is located at an edge of the MBS area;

or $$P = \sum_{i=0}^{N_2} a_i T_i, \text{ wherein,}$$

(1) $T_i = \begin{cases} 0 & \text{When a NACK message is not received in the } i\text{th transmission nearest to the present time} \\ 1 & \text{when a NACK message is received in the } i\text{th transmission nearest to the present time} \end{cases}$ $a_i$: a preset constant of the system (2) P>P1; and (3) The base station in the MBS area is located at an edge of the MBS area.

In step 307, the base station transmits a message to the MCBCS Server. The type of the message is an intelligent assisted transmission prompt, indicating that the feedback from the current user equipment shows poor channel quality. Meanwhile, it also prompts the MCBCS Server to start intelligent assisted transmission.

Figure 4:
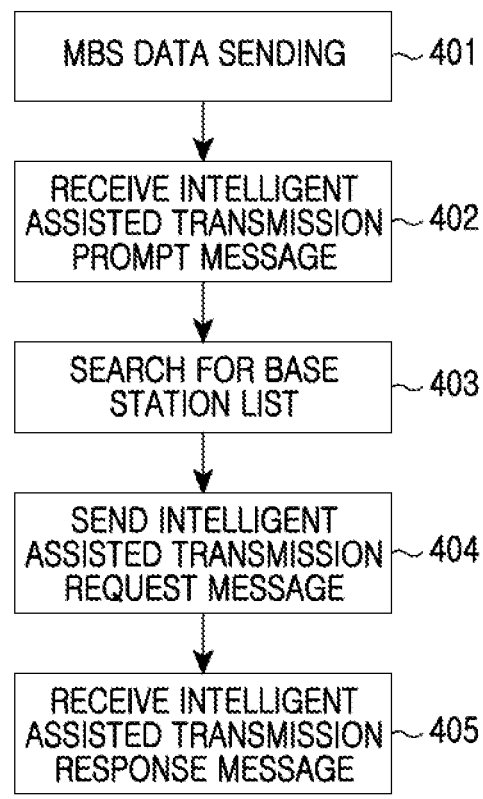
FIG. 4 is a schematic diagram of actions performed at a Multicast and Broadcast Service (MCBCS) Server end according to an exemplary embodiment of the present invention.

FIG. 4 is a schematic diagram of actions performed at an MCBCS Server end according to an exemplary embodiment of the present invention.

Referring to FIG. 4, in step 401, the MCBCS Server transmits the MBS data to the base station in the MBS area and the base stations which are outside the MBS area and which have joined in intelligent assisted transmission.

In step 402, the MCBCS Server receives the message from the base station in the MBS area and determines a type of the message. If it is determined that the type of the message is an intelligent assisted transmission prompt, the process proceeds to step 403.

In step 403, the MCBCS Server determines a geographical location of the base station and, using the location, determines a list of base stations that are adjacent to the base station in the MBS area but not belonging to the MBS area.

In step 404, the MCBCS Server transmits a message to some or all of the base stations on the list. The type of the message is an intelligent assisted transmission request, indicating that the MCBCS Server invites these base stations to join in intelligent assisted transmission.

In step 405, the MCBCS Server receives messages from some or all of the base stations outside the MBS area. The type of the message type is an intelligent assisted transmission response. The MCBCS Server therefore is aware of that these base stations have joined in intelligent assisted transmission, and transmits MBS data to them.

Figure 5:
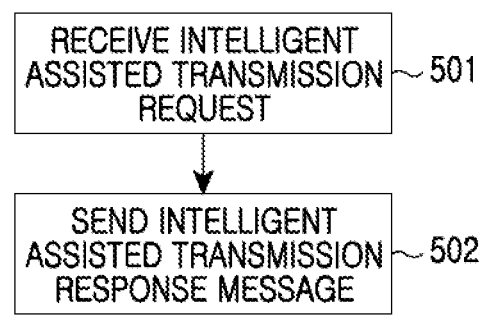
FIG. 5 is a schematic diagram of actions performed at a base station end outside an MBS area and which does not join in intelligent assisted transmission according to an exemplary embodiment of the present invention.

FIG. 5 is a schematic diagram of actions performed at a base station end outside an MBS area and which does not join in intelligent assisted transmission according to an exemplary embodiment of the present invention.

Referring FIG. 5, in step 501, the base station receives a message transmitted by the MCBCS Server. If the type of the message is an intelligent assisted transmission request, the base station indicates that the MCBCS Server invites itself to join intelligent assisted transmission, and the process proceeds to step 502.

In step 502, the base station transmits a message to the MCBCS Server. The type of the message is an intelligent assisted transmission response, which may indicate that this base station has joined in intelligent assisted transmission.

Figure 6:
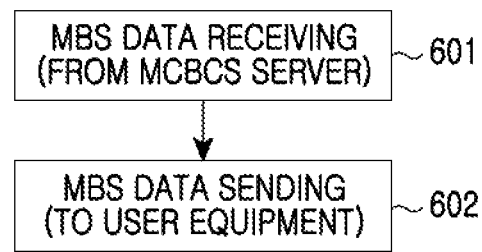
FIG. 6 is a schematic diagram of actions performed at a base station end outside an MBS area but which joins in intelligent assisted transmission according to an exemplary embodiment of the present invention.

FIG. 6 is a schematic diagram of actions performed at a base station end outside an MBS area but which joins in intelligent assisted transmission according to an exemplary embodiment of the present invention.

Referring to FIG. 6, in step 601, the base station receives the MBS data transmitted by the MCBCS Server.

In step 602, the base station transmits, to the user equipment, the MBS data received from the MCBCS Server.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing intelligent transmission assistance, the method comprising:

transmitting, by a Multicast and Broadcast Service (MCBCS) Server, Multicast Broadcast Service (MBS) data to a base station in an MBS area;

transmitting, by the base station, the MBS data to a user equipment;

if the user equipment cannot correctly receive the MBS data, returning a Not Acknowledgement (NACK) message to the base station;

determining, by the base station, the number of received NACK messages;

transmitting, by the base station, an intelligent transmission assistance prompt to the MCBCS Server based on the number of received NACK messages;

determining, by the MCBCS Server, at least one base station that is adjacent to the base station outside a MBS area based on a location of the base station;

transmitting, by the MCBCS Server, an intelligent transmission assistance request to the at least one adjacent base station of the base station;

when receiving the intelligent transmission assistance request, returning, by the at least one adjacent base station, an intelligent transmission assistance response;

transmitting, by the MCBCS Server, the MBS data to the at least one adjacent base station; and transmitting, by the at least one adjacent base station, the MBS data to the user equipment.

2. The method according to claim 1, wherein the determining of the number of received NACK messages comprises determining if at least one of:

the number of received NACK message for predetermined transmissions exceeds a threshold and the base station in the MBS area is located at an edge of the MBS area, and the NACK message is received at each transmission for predetermined transmissions and the base station in the MBS area is located at an edge of the MBS area.

3. The method according to claim 1, wherein after the at least one adjacent base station outside the MBS area joins in intelligent transmission assistance, the MCBCS Server transmits the MBS data to the at least one adjacent base station.

4. The method according to claim 1, wherein transmitting, by the base station, of the intelligent transmission assistance prompt to the MCBCS Server comprises transmitting, by at least one of the at least one adjacent base station and a base station adjacent to the base station, the intelligent transmission assistance prompt to the MCBCS Server, and wherein the at least one of the base stations joining in intelligent transmission assistance and the base station in the MBS area transmits the MBS data to the user equipment.

5. The method of claim 1, wherein the transmitting, by the MCBCS Server, the intelligent transmission assistance request to the at least one adjacent base station comprises:

searching for a plurality of base stations adjacent to the base station; and transmitting the intelligent transmission assistance request to the searched base stations.

6. The method of claim 5, further comprising:

receiving, by the MCBCS Server, an intelligent transmission assistance response message from the searched base stations.

7. A method for receiving Multicast Broadcast Service (MBS) data using intelligent transmission assistance in a wireless communication system, the method comprising:

receiving, by a user equipment, an MBS data via a base station which is transmitted by a Multicast and Broadcast Service (MCBCS) Server;

returning, by the user equipment, a Not Acknowledgement (NACK) message to the base station if the received MBS data is not correct; and receiving, by the user equipment, the MBS data via at least one adjacent base station, wherein, when the base station receives the NACK message, the base station determines a number of received NACK messages received and transmits an intelligent transmission assistance prompt to the MCBCS Server if at least one of the number of received NACK message for predetermined transmissions exceeds a threshold and the NACK message is received at each transmission for predetermined transmissions, the MCBCS Server determines at least one base station that is adjacent to the base station outside a MBS area based on a location of the base station, the MCBCS Server transmits an intelligent transmission assistance request to the at least one adjacent base station, the adjacent base station returns an intelligent transmission assistance response to the MCBCS Server, and the MCBCS Server transmits the MBS data to the at least one adjacent base station.

8. The method according to claim 7, wherein after the at least one adjacent base station outside the MBS area joins in intelligent transmission assistance, the MCBCS Server transmits the MBS data to the at least one adjacent base station.

9. The method according to claim 7, wherein the base station transmitting an intelligent transmission assistance prompt to the MCBCS Server is at least one of the at least one adjacent base station and a base station adjacent to the base station transmitting an intelligent transmission assistance prompt to the MCBCS Server, and wherein the at least one of the base stations joining in intelligent transmission assistance and the base station in the MBS area transmits the MBS data to the user equipment.

10. A user equipment for receiving Multicast Broadcast Service (MBS) data using intelligent transmission assistance in a wireless communication system, the user equipment comprising:

a receiver for receiving an MBS data via a base station which is transmitted by a Multicast and Broadcast Service (MCBCS) Server; and a transmitter for returning a Not Acknowledgement (NACK) message to the base station if the received MBS data is not correct, wherein the receiver receives the MBS data via at least one adjacent base station, and wherein, when the base station receives the NACK message, the base station determines a number of received NACK messages received and transmits an intelligent transmission assistance prompt to the MCBCS Server if at least one of the number of received NACK messages for predetermined transmissions exceeds a threshold and the NACK message is received at each transmission for predetermined transmissions, the MCBCS Server determines at least one base station that is adjacent to the base station outside a MBS area based on a location of the base station, the MCBCS Server transmits an intelligent transmission assistance request to the at least one adjacent base station, the at least one adjacent base station returns an intelligent transmission assistance response to the MCBCS Server, and the MCBCS Server transmits the MBS data to the at least one adjacent base station.

11. The user equipment according to claim 10, wherein after the at least one adjacent base station outside the MBS area joins in intelligent transmission assistance, the MCBCS Server transmits the MBS data to the at least one adjacent base station.

12. The user equipment according to claim 10, wherein the base station transmitting an intelligent transmission assistance prompt to the MCBCS Server is at least one of the at least one adjacent base station and a base station adjacent to the base station transmitting an intelligent transmission assistance prompt to the MCBCS Server, and wherein the at least one of the base stations joining in intelligent transmission assistance and the base station in the MBS area transmits the MBS data to the user equipment.

13. A system for providing intelligent transmission assistance, the system comprising:

a Multicast and Broadcast Service (MCBCS) Server for transmitting Multicast Broadcast Service (MBS) data to a base station in an MBS area, determining at least one base station that is adjacent to the base station outside a MBS area based on a location of the base station, transmitting an intelligent transmission assistance request to at least one adjacent base station of the base station and transmitting the MBS data to the at least one adjacent base station;

the base station for transmitting the MBS data to a user equipment and transmitting an intelligent transmission assistance prompt to the MCBCS Server when receiving the NACK message;

the user equipment for returning a Not Acknowledgement (NACK) message to the base station if the user equipment cannot correctly receive the MBS data; and the at least one adjacent base station for returning an intelligent transmission assistance response when receiving the intelligent transmission assistance request and transmitting the MBS data to the user equipment, wherein the base station transmits an intelligent transmission assistance prompt to the MCBCS Server based on the number of received NACK messages.

14. The system according to claim 13, wherein the base station determines the number of received NACK messages, if at least one of:

the number of received NACK message for predetermined transmissions exceeds a threshold and the base station in the MBS area is located at an edge of the MBS area, and the NACK message is received at each transmission for predetermined transmissions and the base station in the MBS area is located at an edge of the MBS area.

15. The system of claim 14, wherein the MCBCS Server receives an intelligent transmission assistance response message from the searched base stations.

16. The system according to claim 13, wherein after the at least one adjacent base station outside the MBS area joins in intelligent transmission assistance, the MCBCS Server transmits the MBS data to the at least one adjacent base station.

17. The system according to claim 13, wherein the base station transmitting an intelligent transmission assistance prompt to the MCBCS Server is at least one of the at least one adjacent base station and a base station adjacent to the base station transmitting an intelligent transmission assistance prompt to the MCBCS Server, and wherein the at least one of the base stations joining in intelligent transmission assistance and the base station in the MBS area transmits the MBS data to the user equipment.

18. The system of claim 13, wherein the MCBCS Server searches for a plurality of base stations adjacent to the base station and transmits the intelligent transmission assistance request to the searched base stations.

19. A method of a base station for providing intelligent transmission assistance in a wireless communication system, the method comprising:

receiving Multicast Broadcast Service (MBS) data from a Multicast and Broadcast Service (MCBCS) Server;

transmitting the MBS data to a user equipment;

receiving a Not Acknowledgement (NACK) message from the user terminal;

determining the number of received NACK messages; and transmitting an intelligent transmission assistance prompt to the MCBCS Server based on the number of received NACK messages;

wherein the base station transmits the intelligent transmission assistance prompt to the MCBCS Server if at least one of:

the number of received NACK message for predetermined transmissions exceeds a threshold and the base station in the MBS area is located at an edge of the MBS area, and the NACK message is received at each transmission for predetermined transmissions and the base station in the MBS area is located at an edge of the MBS area.

20. A method of a Multicast and Broadcast Service (MCBCS) Server for providing intelligent transmission assistance in a wireless communication system, the method comprising:

transmitting Multicast Broadcast Service (MBS) data to a base station;

receiving an intelligent transmission assistance prompt from the base station;

determining at least one base station that is adjacent to the base station outside a MBS area based on a location of the base station;

transmitting an intelligent transmission assistance request to the at least one adjacent base station of the base station;

receiving an intelligent transmission assistance response from the at least one adjacent base station;

transmitting the MBS data to the at least one adjacent base station; and wherein the base station transmits the intelligent transmission assistance prompt to the MCBCS Server if at least one of:

the number of received NACK message for predetermined transmissions exceeds a threshold and the base station in the MBS area is located at an edge of the MBS area, and the NACK message is received at each transmission for predetermined transmissions and the base station in the MBS area is located at an edge of the MBS area.

* * * * *